United States Patent
Kakiuchi et al.

(10) Patent No.: US 6,242,040 B1
(45) Date of Patent: Jun. 5, 2001

(54) FUNCTIONAL SODIUM CHLORIDE COMPOSITIONS

(75) Inventors: Toshihito Kakiuchi, Tsuchiura; Seishi Takenawa, Nara; Kiyohiko Kunugita, Tsukuba, all of (JP)

(73) Assignee: Fujisawa Pharmaceutical Co., Ltd., Osaka (JP)

( * ) Notice: Subject to any disclaimer, the term of this patent is extended or adjusted under 35 U.S.C. 154(b) by 0 days.

(21) Appl. No.: 09/147,523
(22) PCT Filed: Jul. 10, 1997
(86) PCT No.: PCT/JP97/02412
§ 371 Date: Jan. 14, 1999
§ 102(e) Date: Jan. 14, 1999
(87) PCT Pub. No.: WO98/02051
PCT Pub. Date: Jan. 22, 1998

(30) Foreign Application Priority Data

Jul. 15, 1996 (JP) ................................................ 8-205195

(51) Int. Cl.[7] .............................. A23L 1/237; A21D 2/08
(52) U.S. Cl. .............................. 426/649; 426/74; 426/79; 426/268; 426/619; 426/622; 426/648; 424/600
(58) Field of Search ................................. 424/434, 440, 424/441, 600; 426/74, 79, 268, 619, 622, 648

(56) References Cited

U.S. PATENT DOCUMENTS

| | | | |
|---|---|---|---|
| 4,473,595 | * 9/1984 | Rood et al. | 426/649 |
| 5,605,697 | 2/1997 | Asano et al. | 424/440 |
| 5,800,830 | 9/1998 | Asano et al. | 424/439 |

FOREIGN PATENT DOCUMENTS

9617521 * 6/1996 (WO).

* cited by examiner

Primary Examiner—F. T. Moezie
(74) Attorney, Agent, or Firm—Oblon, Spivak, McClelland, Maier & Neustadt, P.C.

(57) ABSTRACT

Novel functional sodium chloride compositions containing sodium gluconate as a substitute for the conventionally employed sodium chloride and being efficacious in preventing hypertension and the onset of complications thereof in the brain, heart, kidney; etc. These compositions are prepared by adding 40 to 400 parts by weight of sodium gluconate to 100 parts by weight of compositions containing 40 to 60% by weight of sodium chloride and 60 to 40% by weight of potassium chloride. These compositions are usable as a table salt for seasoning foods or in imparting the required saltiness to foods such as crackers or snacks. They are particularly appropriate for those who should cut down on the amount of salt in the diet.

4 Claims, 1 Drawing Sheet

FUNCTIONAL SODIUM CHLORIDE COMPOSITIONS

TECHNICAL FIELD

Figure 1:
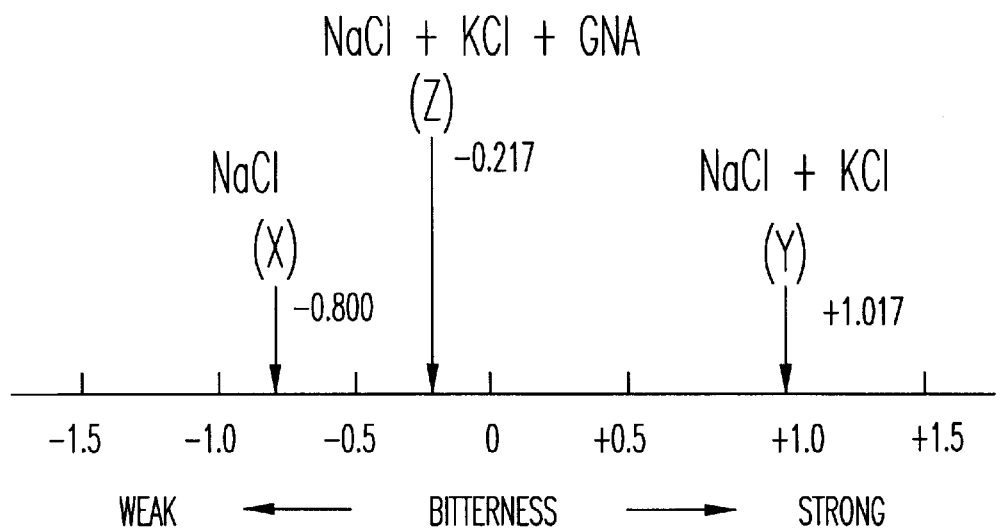
Figure 2:
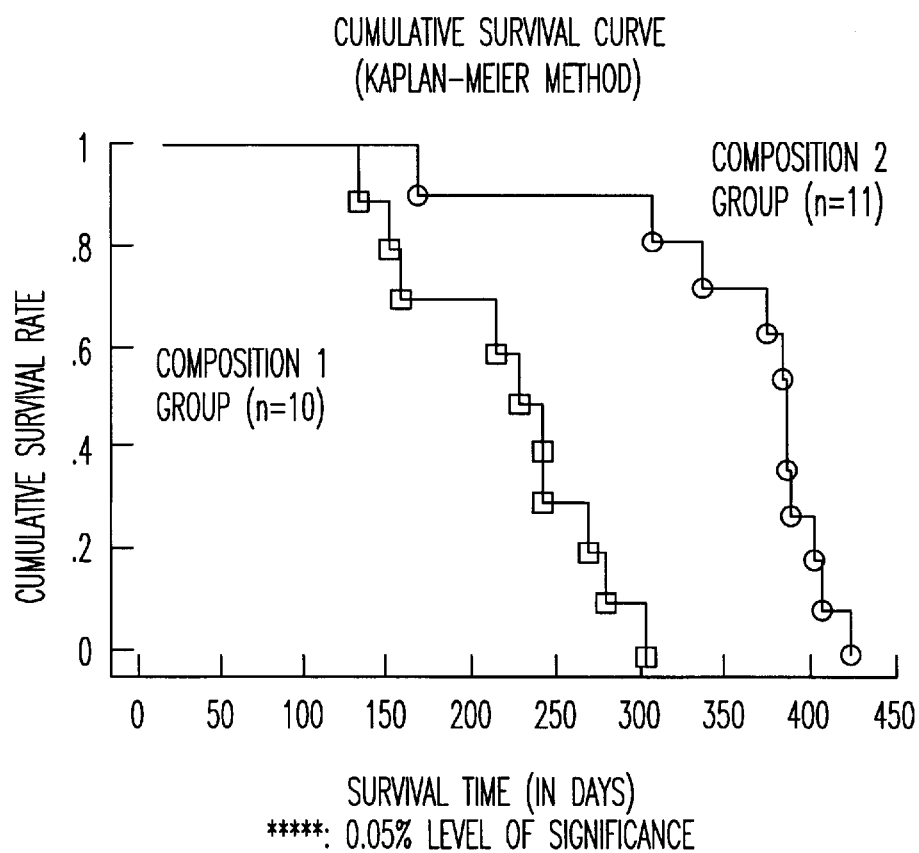

This invention relates to a novel functional sodium chloride composition containing sodium gluconate, which is effective in preventing hypertension or onset of cerebral, cardiac, and renal complications of hypertension, as a substitute for salt (sodium chloride or NaCl). This composition is particularly suitable for use as a table salt for imparting saltiness to dishes or as an ingredient in food products requiring a salty taste, such as crackers and snack foods, particularly for persons in whom salt-restricted diets are indicated.

BACKGROUND ART

It is well known that the age-associated elevation of blood pressure is promoted by sodium chloride loading and, therefore, cutting on the intake of sodium chloride is generally recommended. Moreover, for the prevention of hypertension and renal diseases arising from an excessive intake of sodium chloride, salt-reduced foods and functional dietary salts prepared by partial substitution of potassium for sodium have been developed. However, reducing the amount of sodium chloride results in flat tastes while the use of the potassium salt leads to prominence of the bitter taste characteristic of potassium chloride. Thus, in whichever of the cases, organoleptic drawbacks are inevitable. The eating habit of the Japanese is centered around the favor of saltiness but in order that one may lead a healthy dietary life, there must be available salt compositions capable of providing saltiness in degrees comparable to that of sodium chloride without affecting one's blood pressure. Here is the problem that must be solved.

Regarding the use of salts of organic acids in lieu of sodium chloride, there is a report on the use of citric acid (Japanese Kokai Tokkyo Koho H6-189709). It is claimed, there, that hypertension can be prevented or cured by substituting potassium chloride for part of sodium chloride and, for masking the bitterness of potassium chloride, adding a citrate, particularly tripotassium citrate. However, the saltiness attained is not quality-wise equivalent to that of sodium chloride.

DISCLOSURE OF THE INVENTION

The inventors of this invention did an intensive exploration for a solution to the problem that there was not an agent providing for saltiness quality-wise equivalent to that of sodium chloride without inducing elevation of blood pressure and arrived at sodium gluconate which, among various salts of sodium, has little effect on blood pressure. The inventors then created a functional sodium chloride composition equivalent to sodium chloride taste-wise by adding sodium gluconate to the conventional potassium salt composition (a mixture of sodium chloride and potassium chloride) and have ultimately developed this instant invention.

This invention, therefore, is concerned with a performance (functional) salt composition available upon blending of about 40–400 parts by weight (preferably about 50–100 parts by weight) of sodium gluconate with 100 parts by weight of a mixture of about 40–60 weight % of sodium chloride and about 60–40 weight % of potassium chloride.

This invention provides a novel functional dietary salt composition taking the pace of the conventional agent sodium chloride and useful for preventing hypertension or onset of cerebral, cardiac and renal complications of hypertension. The composition may find application as a substitute table salt for imparting saltiness to dishes or as an ingredient in crackers, snack foods and other food products requiring saltiness.

The functional sodium chloride composition of the invention which, as aforesaid, is a composition available upon blending of about 40–400 parts by weight of sodium gluconate with 100 parts by weight of a mixture salt consisting of about 40–60 weight % of sodium chloride and about 60–40 weight % of potassium chloride has a salty taste of the same quality as that of sodium chloride and is characterized in that it scarcely contributes to age-related elevation of blood pressure and inhibits onset of apoplexy.

In the functional sodium chloride composition of the invention, the weight ratio of sodium chloride to potassium chloride should be within the range of 60:40 through 40:60. When potassium chloride is used in excess of 60 weight %, the bitterness of potassium chloride can hardly be masked. When the proportion of potassium chloride is smaller than 40 weight %, the sodium-sparing effect is limited. A mixture of sodium chloride and potassium chloride presents a characteristic bitter taste but this bitterness can be masked by adding sodium gluconate. However, when the level of addition of sodium gluconate is below 40 parts by weight relative to 100 parts by weight of said mixture, the bitterness cannot be effectively masked. On the other hand, when the level of addition exceeds 400 parts by weight on the same basis, the necessary saltiness is not fully developed.

It is also possible to add magnesium chloride to the above ternary mixture of sodium gluconate, potassium chloride and sodium chloride. In this case, the preferred level of magnesium chloride is 1 about 100 parts by weight relative to 100 parts by weight of said ternary mixture.

Furthermore, the functional sodium chloride composition of the invention may contain one or more other components than sodium gluconate, potassium chloride, sodium chloride and magnesium chloride in a suitable proportion.

In the present invention, the mode of blending the components is not critical but the per se known methods can be employed.

For demonstrating the usefulness of the functional sodium chloride composition of the invention, tests for comparative evaluation of saltiness and other functional qualities were performed using samples of the composition. The results are presented below.

TEST EXAMPLE 1

Saltiness Comparison Test

The concentration of a sodium gluconate (40 weight %)—sodium chloride (35 weight %)—potassium chloride (25 weight %) premix in water which was equivalent to 2 weight % aqueous sodium chloride solution in saltiness was explored. In the following description, sodium gluconate is sometimes indicated by the symbol GNA, sodium chloride by NaCl, and potassium chloride by KCl.

Aqueous solutions of the above premix as prepared to various concentrations and 2 weight % aqueous sodium chloride solution were compared for saltiness in a sensory evaluation system. The results are shown in Table 1.

TABLE 1

| Concentration of premix (wt. %) | 2.0 | 2.2 | 2.4 | 3.0 |
|---|---|---|---|---|
| Degree of saltiness | Weak | Weak | Slightly weak | Substantially equivalent |

TEST EXAMPLE 2

Saltiness Comparison Test Using the Functional Sodium Chloride Composition of the Invention and Sodium Chloride A 3 weight % aqueous solution of the GNA (35 wt. %)—NaCl (35 wt. %)—KCl (30wt. %) premix and 2 weight % aqueous NaCl solution were compared in a 3-sample discrimination test (triangle test).

Each panelist was given 3 cups containing the test solutions, one of which contained a different solution with the remaining two cups containing one and the same solution and instructed to select one with a different taste. The test was performed twice changing the combination. As a result, the selection may be 11 of 30 panelists was correct and this result was not statistically significant. Thus, no difference was found between the two solutions.

TEST EXAMPLE 3

A Saltiness Comparison Test Using the Functional Sodium Chloride Composition of the Invention as Further Supplemented with Magnesium Chloride and Sodium Chloride The 3 weight % aqueous solution of the composition obtained in Example 2 and the 2 weight % aqueous solution of sodium chloride, which were equal in saltiness, were evaluated by the 3- sample discrimination method (triangle test). As a result, the correct discrimination was made by only 15 out of 30 panelists.

TEST EXAMPLE 4

Bitterness Ameliorating Effect Comparison Test

The degree of bitterness amelioration which was obtained by adding sodium gluconate (GNA) to a sodium chloride (NaCl)—potassium chloride (KCl) composition was evaluated by a sensory test.

Sensory Test Protocol

The following three solutions equated in the intensity of saltiness, X, Y, and Z, were used in combinations of two each and the first-tasted sample (A) and the second-tested sample (B) were compared and scored on the following scale. The panel consisted of 10 tasters.

Salt Solutions

X: 3 wt. % NaCl/water
Y: 1.8 wt. % NaCl+1.8 wt. % KCl/water
Z: 1.4 wt. % NaCl+1.4 wt. % KCl+1.4 wt. % GNA/water Scoring Scale +3: A is considerably bitterer than B
+2: A is moderately bitterer than B
+1: A is slightly bitterer than B
0: equivocal
−1: B is slightly bitterer than A
−2: B is moderately bitterer than A
−3: B is considerably bitterer than A

TABLE 2

| Before | After | +3 | +2 | +1 | 0 | −1 | −2 | −3 | Total score | Mean score |
|---|---|---|---|---|---|---|---|---|---|---|
| X | Y | 0 | 0 | 2 | 0 | 3 | 1 | 4 | −15 | −1.5 |
| Y | X | 3 | 3 | 2 | 0 | 2 | 0 | 0 | +15 | +1.5 |
| X | Z | 0 | 2 | 0 | 2 | 3 | 2 | 1 | −6 | −0.6 |
| Z | X | 2 | 3 | 2 | 2 | 0 | 1 | 0 | +12 | +1.2 |
| Y | Z | 2 | 5 | 2 | 1 | 0 | 0 | 0 | +18 | +1.8 |
| Z | Y | 0 | 1 | 1 | 1 | 1 | 4 | 2 | −13 | −1.3 |
| Total | | 7 | 14 | 9 | 6 | 9 | 8 | 7 | | |

Analysis of variance of the above data revealed that the intensity of bitterness was in the order of NaCl+KCl (Y), NaCl+KCl+GNA (Z), and NaCl alone (X) and a significant difference was found between X and Y and between Y and Z but no significant difference was found between X and Z. It was, therefore, clear that addition of GNA masked the bitterness of KCl.

The relationship of the intensities of bitterness of X, Y, and Z is diagrammatically illustrated in FIG. 1.

TABLE 3

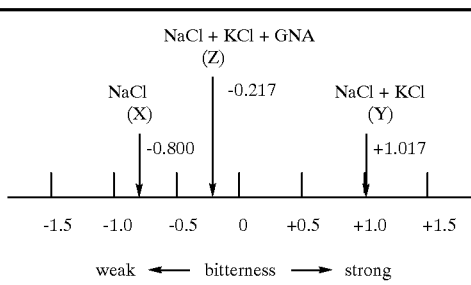

Then, a comparative test was performed for demonstrating the usefulness of sodium gluconate which is a main component of the functional sodium chloride composition of the invention.

TEST EXAMPLE 5

Effect on Blood Pressure in Hypertensive Rats (1) Method

Male spontaneously hypertensive rates (SHR) purchased from Japan SLC at the age of 4 weeks were preliminarily fed with the commercial food CE-2 Powder (Clea Japan) for 1 week and submitted to the experiment at the age of 5 weeks. Using stainless steel suspension breeding cages, 4 SHRs were housed per cage. Before commencement of the experiment, the rats were divided into groups of 8 in such a manner that their group mean body weights would be equal. To the commercial powdery low-salt food (Clea Japan, Na concentration 11.3 mg/100 g), the test compositions were respectively added as shown in Table 4 and the animals were allowed free access to the diets (Na concentration 0.527 weight %) and water (tap water containing 2 ppm of chlorine). The blood pressure and body weight were determined at commencement of feeding and thereafter at intervals of 2~3 weeks. The animal room was controlled at 23±1° C. and 55±5% RH, with a 12-hr lighting cycle (ON 8:00~20:00, OFF 20:00~8:00). To generate blood pressure data, the systolic blood pressure of the tail artery of rats was measured with Muromachi Machinery's MK1000.

TABLE 4

Level of addition of test compositions 1~3 (weight %)

|  | NaCl | GNA | MNA | Corn starch |
|---|---|---|---|---|
| Composition 1 | 1.34 | 0.00 | 0.00 | 3.66 |
| Composition 2 | 0.00 | 5.00 | 0.00 | 0.00 |

As the basal diet, the powdery low-salt food from Clea Japan was used. The Na concentration of the prepared diets was 0.527 weight %.

In the table, GNA stands for sodium gluconate (2) Results

At week 3 of the experiment, a difference in blood pressure began to appear between the GNA (Composition 2)-fed group and the NaCl (Composition 1)-fed group and the blood pressure in the GNA (Composition 2) group being significantly lower consistently till week 11. There was no difference in body weight between the groups. The data are shown in Table 5.

TABLE 5

The time course of systolic blood pressure in SHR

|  |  | Week 0 | 3 | 5 | 7 | 9 | 11 | 13 |
|---|---|---|---|---|---|---|---|---|
| Blood pressure | Composition 1 group | 155± 11.6 | 197 ± 11.9 | 230 ± 16.6 | 247 ± 15.9 | 254 ± 16.3 | 254 ± 16.0 | 276 ± 20.7 |
|  | Composition 2 group | 157 ± 10.1 | 189 ± 15.9 | 207 ± 10.6 | 225 ± 12.6 | 230 ± 7.6 | 231 ± 16.7 | 250 ± 12.9 |
| ANOVA | Composition 1 to Composition 2 | NS | 0.05 | 0.005 | 0.01 | 0.005 | 0.01 | 0.01 |
| Body weight | Composition 1 group | 117 ± 5.0 | 243 ± 10.6 | 281 ± 10.4 | 312 ± 12.9 | 331 ± 12.5 | 349 ± 12.6 | 363 ± 17.2 |
|  | Composition 2 group | 117 ± 6.6 | 239 ± 12.9 | 279 ± 10.0 | 310 ± 10.2 | 331 ± 10.8 | 349 ± 10.5 | 362 ± 10.0 |

ANOVA: analysis of variance

TEST EXAMPLE 6

Effect on the Heart and Kidney in SHR (1) Method

When the rats used in the above experiment on the effect on blood pressure reached the age of 20 weeks, their body weights were determined. The animals were then suffocated to death with dry ice and the heart and kidney were isolated and weighed to record wet weights. The respective organ weights were adjusted for body weight and tabulated.

(2) Results

The test results are presented in Table 6. The heart weight and kidney weight in the GNA (Composition 2)-fed group were significantly low. The animals in the NaCl (Composition 1)-fed group developed hypertrophy of the heart and kidney due to the marked NaCl loading on the heart and kidney, thus accounting for the significant differences in heart weight and kidney weight. The results indicated that GNA is useful for the prevention of hypertension-associated renal failure and cardiomegaly.

TABLE 6

The heart and kidney weights (g) of SHR at week 20 of feeding
(n = 8, mean ± standard deviation)

|  |  |  |  | Organ weights per kg body weight | |
|---|---|---|---|---|---|
|  | Body weight | Heart weight | Kidney weight | Heart weight | Kidney weight |
| Composition 1 group | 390 ± 18.3 | 1.8 ± 0.11 | 3.5 ± 0.19 | 4.6 ± 0.29 | 8.9 ± 0.38 |
| Composition 2 group | 397 ± 12.5 | 1.7 ± 0.08 | 3.3 ± 0.15 | 4.2 ± 0.15* | 8.3 ± 0.22** |

*0.5% level of significance
**1% level of significance

TEST EXAMPLE 7

Effect on Apoplexy (Life Span) in Apoplectic Rats (1) Method

Male SHRSP/Izm (briefly, SHRSP) rats purchased from Funabashi Farm were fed in the same manner as the SHRs used in the experiment on the effect of blood pressure and were monitored until death. Unlike the rats used in the blood pressure experiment, those rats were divided into groups of 10~11 and housed 3~4 individuals per cage.

(2) Results

The results are presented in Table 7. A significant difference was found in the number of survival days between the Composition 2-fed group and the Composition 1-fed group. The mean life span was 359±71.9 days in the Composition 2 group versus 222±58.8 days in the Composition 1 group. Analysis by the Kaplan-Meier method revealed a significant intergroup difference at the 0.05% level of significance. Because of their inherited character, SHRSPs die of apoplexy without living through the average life span of rats.

TABLE 7

Cumulative survival curve (Kaplan-Meier method)

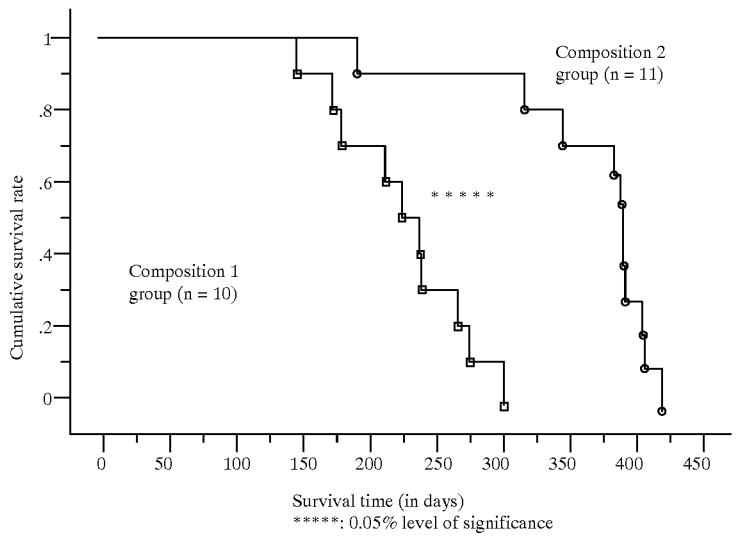

Survival time (in days)
*****: 0.05% level of significance

The results of the above experiments indicated that the functional sodium chloride composition containing sodium gluconate according to the invention is equivalent to sodium chloride in saltiness. Moreover, as tested in spontaneously hypertensive rats, the functional sodium chloride composition of the invention as a feed supplement tends to inhibit age-associated elevation of blood pressure as compared with sodium chloride. It is also found that the composition is useful for the prophylaxis of hypertension associated renal failure and cardiomegaly. Furthermore, as tested in the SHRSP, the functional sodium chloride composition of the invention acts in an inhibitory way on apoplexy to prolong the life span of rats.

The above results indicate that the functional sodium chloride composition available upon blending of 40~400 parts by weight of sodium gluconate with 100 parts by weight of a mixture of 40~60 weight % of sodium chloride and 60~40 weight % of potassium chloride is equivalent to sodium chloride in saltiness, scarcely contributory to age-associated elevation of blood pressure, and inhibitory against onset of apoplexy.

The following examples are further illustrative of the invention but by no means limitative of the scope of the invention.

EXAMPLE 1

A functional sodium chloride composition (100 g) was obtained by blending 35 g of sodium gluconate with 35 g of sodium chloride and 30 g of potassium chloride.

EXAMPLE 2

A functional sodium chloride composition (102 g) was obtained by blending 2 g of magnesium chloride with 100 g of the composition obtained in Example 1.

What is claimed is:

1. A sodium chloride replacement composition available upon blending of 40~400 parts by weight of sodium gluconate to 100 parts by weight of a mixture of 40~60 weight % of sodium chloride and 60~40 weight % of potassium chloride.

2. A sodium chloride replacement composition available upon blending 1~10 parts by weight of magnesium chloride with 100 parts by weight of the sodium chloride replacement composition defined in claim 1.

3. A method of preventing hypertension or onset of cerebral, cardiac and renal complications of hypertension, comprising administering an effective amount of the composition of claim 1 to a human in need thereof.

4. A method of preventing hypertension or onset of cerebral, cardiac and renal complications of hypertension, comprising administering an effective amount of the composition of claim 2 to a human in need thereof.

* * * * *